US006041373A

United States Patent [19]

Pham

[11] Patent Number: 6,041,373

[45] Date of Patent: Mar. 21, 2000

[54] ENHANCED SCSI TRANSMITTER AND ADAPTER

[75] Inventor: Duc Pham, Cupertino, Calif.

[73] Assignee: Diamond Multimedia Systems, Inc., Santa Clara, Calif.

[21] Appl. No.: 08/862,567

[22] Filed: May 23, 1997

[51] Int. Cl.[7] .................................................... G06F 13/00

[52] U.S. Cl. .............................................................. 710/62

[58] Field of Search .................................... 395/882, 306; 439/74, 497; 326/30; 710/62, 126, 2, 100, 102

[56] References Cited

U.S. PATENT DOCUMENTS

| | | | |
|---|---|---|---|
| 5,422,580 | 6/1995 | Mandel et al. | 326/30 |
| 5,628,637 | 5/1997 | Pecone et al. | 439/74 |
| 5,680,555 | 10/1997 | Bodo et al. | 395/306 |
| 5,745,795 | 4/1998 | Pecone et al. | 395/882 |
| 5,785,550 | 7/1994 | Leshem et al. | 439/497 |

OTHER PUBLICATIONS

Document entitled: Plug and Play SCSI Specification, Version 1.0, Mar. 30, 1994, by Adaptec, AT &T Global Information Solutions, Digital Equipment Corporation, Future Domain, Maxtor, and Microsoft.

*Primary Examiner*—Joseph E. Palys
*Assistant Examiner*—Omar A. Omar
*Attorney, Agent, or Firm*—Gerald B. Rosenberg; New Tech Law

[57] ABSTRACT

A kit in accordance with the invention is disclosed that allows for simultaneous connectivity of a variety of SCSI devices to a SCSI card via a SCSI bus. Such SCSI devices include internal narrow, internal wide, external narrow, and external wide devices. A kit in accordance with the invention includes a terminator-adapter. The terminator-adapter includes a first wide connector, a second narrow connector, and a wide bus including an upper and lower bus. The upper bus is coupled to the wide connector and is first and second connector as well as a soft terminator. By enabling the soft terminator, the terminator-adapter behaves as a wide bus terminator. By disabling the soft terminator, the terminator-adapter behaves as a wide-to-narrow adapter. A kit in accordance with the invention may further include a wide cable and a SCSI card. In various embodiments, the SCSI card includes a wide internal connector and a narrow internal connector.

16 Claims, 9 Drawing Sheets

ENHANCED SCSI TRANSMITTER AND ADAPTER

BACKGROUND OF THE INVENTION

1. Field of Invention

The invention relates to computer I/O devices, and particularly to SCSI devices.

2. Related Art

Small Computer System Interface (SCSI) is a standardized intelligent bus for transmitting data and commands between a variety of I/O devices, including disk drives, scanners, and CD-ROM devices. Since its inception in the mid-1980's, SCSI has evolved through several generations, including SCSI-1, SCSI-2, and SCSI-3. Each generation is its own standard developed and/or maintained by the American National Standards Institute (ANSI). Further, each generation is generally backward compatible with the last generation. Thus, each generation includes or is responsive to at least the signals defined in the prior generation.

Each SCSI generation supports a faster data transfer rate than the last. For instance, the SCSI-1 standard supports the transmission of 8-bits of data at up to 5 MBps. The SCSI-2 standard also supports an 8-bit data bus at a rate of up to 5 MBps or, if the "Fast SCSI" variation of SCSI-2 is used, up to 10 MBps. SCSI-2 also optionally supports a wide data bus of 16 or 32 bits (Wide SCSI). Wide SCSI can transmit 16 bits of data at speeds of 20 MBps and 32 bits of data at speeds of 40 MBps. SCSI-3 supports a mode of operation called Fast-20 SCSI, also known as Ultra SCSI or Double Speed SCSI. With an 8-bit data bus, Fast-20 can transmit data at up to 20 MBps, and with a 16-bit data bus, at up to 40 MBps.

Generally, SCSI devices and busses that support an 8-bit data bus are referred to as narrow devices and SCSI devices and busses that support a 16- or 32-bit data bus are referred to as wide devices. In addition to the data signals, however, a parity bit may also be transmitted and is used for error checking. Thus, a so-called narrow data bus may actually transmit 9-bits. Other similar types of signals may be added and transmitted as data that do not affect the characterization of a narrow device as narrow or a wide device as wide. Further, other command signals are also transmitted through the SCSI bus in addition to the data signals.

Structurally, each SCSI device is coupled to another SCSI device via a cable, which houses the SCSI bus. The SCSI bus operates in a backbone configuration, i.e., one that essentially has two main ends with only very short drops (or stubs) between the ends to connect various devices to the bus. The SCSI bus cannot operate in a loop, a star (or hub), or a T-shape configuration due to reflections and signal degradation. The short drops are designed so as not to be long enough to cause signal reflections significant enough to affect system operation.

To further avoid signal degradation, the cables used for the SCSI bus are subject to stringent specifications. For instance, with a narrow, fast SCSI-2 system, the cable length cannot exceed three meters, and each drop (or stub) from the main cable to each device cannot exceed 0.1 meters. Further, the distance between the stubs must be at least 0.3 meters.

Moreover, each end of the SCSI bus must be terminated to attenuate signal reflections. The SCSI bus itself has a specific impedance. When signals reach the end of the bus, they encounter the air, which has a much higher impedance than the bus itself and which acts like a wall, reflecting the signals back down the SCSI bus. A terminator absorbs the signals and minimizes reflections, typically by a technique known as impedance matching. Terminators are generally fixed or soft. Fixed, or permanent, terminators are always enabled to perform a termination function. Soft terminators can be enabled or disabled to perform a termination function as needed. The soft terminator can be enabled/disabled manually, e.g., with a switch or by physically removing/inserting the terminator, or may be done automatically e.g., via various sensing circuitry such as current sensing or ground sensing circuitry.

To support SCSI connectivity, SCSI cards such as those illustrated in the block diagrams of FIGS. 1 and 2 are placed within a host enclosure, e.g., a PC housing. SCSI cards interact with other parts of the computer system, e.g., the CPU, and serve as a control center for attached SCSI devices. SCSI cards are also often referred to as host adapter or controller cards. SCSI cards typically come in two varieties: narrow and wide.

FIG. 1 shows part of a narrow SCSI card 100. Card 100 includes a narrow internal connector 102 and a narrow external connector 104 coupled with a narrow SCSI bus 106. An internal connector is generally for coupling devices internal to the host enclosure to the SCSI card. An external connector is generally for coupling devices external to the host enclosure to the SCSI card.

A soft terminator 108 is also coupled to the narrow bus 106. If a narrow SCSI device is coupled to connector 102, but no device is coupled to connector 104, then the soft terminator is enabled, terminating the SCSI bus at one end (the other end of the bus is conventionally terminated by a fixed terminator coupled to the narrow SCSI device). Similarly, if a device is coupled to connector 104, but no device is coupled to connector 102, the soft terminator is also enabled. If devices are coupled to each connector 102 and 104, however, then the soft terminator is disabled as it will no longer be at either end of the SCSI bus.

FIG. 2 shows part of a wide SCSI card 200. Card 200 includes a wide internal connector 202, a wide external connector 204, and optionally a narrow internal connector 203. A wide bus 208 is coupled to wide internal connector 202 and wide external connector 204. Wide bus 208 is composed of a lower bus 206 and an upper bus 207, where the lower bus 206 is generally the lower eight (or nine, if a parity bit is used) data bits. The lower bus 206 is further coupled to narrow internal connector 203. Bus 208 is further coupled to a soft terminator 210.

As with the narrow card of FIG. 1, the soft terminator 210 is enabled or disabled depending on whether a SCSI device is coupled on either or both sides of the terminator. For instance, if an internal wide device is coupled to connector 202, but no device is coupled to connector 204, then terminator 210 senses that it is the termination point of the lower bus and is enabled to terminate the lower bus and the upper bus. If a wide external device is coupled to connector 204, and a wide internal device is coupled to connector 202, then terminator 210 is disabled.

Narrow SCSI cards tend to be less expensive to the consumer than wide SCSI cards. Narrow cards, however, do not support connectivity with wide devices. Wide cards, while more expensive, do not allow direct attachment to external narrow devices, although connection to external narrow devices can be accomplished with an adapter. Adapters, in fact, are purchased by a significant number of consumers because, although a commonly used wide device is a hard disk drive, most devices to be attached to a SCSI system are narrow devices, e.g., CD-ROM drives, scanners.

Currently available wide-to-narrow adapters are designed solely for external use and are designed to couple directly to the SCSI card (i.e., connector 204 in FIG. 2). If an adapter is used to attach a narrow device to a wide card, i.e., attach the lower bus of the wide card to the narrow device, the upper bus must be terminated, otherwise reflections will become problematic. Most adapters available, however, do not terminate the upper bus, leaving the upper bus floating, while the lower bus simply passes through the adaptive device. Nonetheless, the entire bus, both upper and lower, will ultimately have to be terminated.

Other adapters currently available permanently terminate the upper bus while allowing lower bus signals to pass through. Such a permanent terminator, however, is often problematic. Most SCSI cards include an upper bus terminator, as in FIG. 2. Nonetheless, while the presence or absence of a device can be sensed on the lower bus, e.g., by current sensing or ground sensing on various control lines of the lower bus, no such sensing ability is available on the upper bus, as the upper bus does not carry signals suitable for sensing the presence of a device. Thus, as shown in FIG. 2, if the terminator on the lower bus is enabled, the upper bus is also terminated (i.e., the upper bus termination is not enabled/disabled independent from the lower bus). To enable or disable the upper bus independently of the lower bus, the only alternative currently available is by manual adjustment, e.g., via switches or physical removal/insertion of the terminator itself. In fact, no method is currently available for reliably sensing the presence of a device on the upper bus, let alone for sensing the presence of a terminator on the upper bus. Therefore, the situation often occurs when using an adapter with a built-in upper bus terminator, that three terminators can be simultaneously enabled on the upper bus: one at either end, and one in the middle. While a SCSI bus requires terminators at either end for signal absorption, a terminator in between those ends will modify the transmission line characteristics and cause interference. Because of this three-terminator problem, most adapters do not include a built-in upper bus terminator.

SCSI cards currently available have another significant drawback. Since SCSI must operate in a backbone configuration, all three connectors of the wide card shown in FIG. 2 cannot be used simultaneously. If all three connectors are used simultaneously, the resulting bus structure is T-shaped, a design that will not function properly. Thus only a limited number of combinations of devices can be simultaneously supported by the SCSI card of FIG. 2 (e.g., external wide and internal wide devices; external wide and internal narrow devices; but not external wide, internal wide, and internal narrow devices simultaneously). To overcome this problem and allow three or more types of devices to be simultaneously connected to the system, the most common solution used is to purchase two SCSI cards: often, a wide card and a narrow card. The purchase of a second SCSI card amounts to significant additional expense to the consumer merely to allow simultaneous connectivity of commonly available SCSI devices.

Despite the rapidity of advancement in the SCSI arena, including the development of new generations of SCSI protocols and the development of I/O devices, and despite the demand of consumers for reliable and simultaneous access to peripheral I/O devices, no inexpensive solutions have been offered. Consumers must continue to buy multiple SCSI host-adapter cards, wide-to-narrow adapters, and terminators of various sizes at considerable expense to achieve a fully connective system.

SUMMARY OF THE INVENTION

A kit in accordance with the invention is disclosed that allows for multiple types of devices, e.g., internal narrow, external narrow, internal wide, and external wide devices, to be simultaneously connected to a SCSI bus without the need for extra adapters.

In particular, a kit in accordance with the invention includes a terminator-adapter unit. The terminator-adapter unit generally includes a wide connector, a narrow connector, an upper bus coupled to the wide connector, a lower bus coupled to both the wide and narrow connectors, a terminator coupled to the upper bus, and a soft terminator coupled to the lower bus. In one embodiment, the terminator coupled to the upper bus is fixed. The terminator-adapter is designed so that with certain combinations of SCSI devices coupled to the SCSI bus, the terminator-adapter behaves as a wide bus terminator and with other combinations of SCSI devices, the terminator-adapter behaves as a wide-to-narrow bus adapter. In certain embodiments, the behavior of the terminator-adapter is automatically switched from adapter to terminator, or vice versa, by the soft terminator's sensing the presence of a narrow device coupled to the terminator-adapter.

In some embodiments, a kit in accordance with the invention further includes a cable. The cable includes a wide connector at either end. The cable further includes an upper bus and a lower bus. One of the connectors on the cable is adapted to be coupled to the wide connector of the terminator-adapter. In one embodiment of the invention, the cable is an ultra-wide SCSI-3 cable.

Still other embodiments of a kit in accordance with the invention further include a SCSI card. The SCSI card includes a wide internal connector and a narrow internal connector. A wide bus on the SCSI card is coupled to the wide connector. The upper bus of the wide bus is terminated with a fixed terminator in one embodiment. The lower bus of the wide bus is further coupled to a narrow internal connector as well as a second terminator. In one embodiment of the invention, the second terminator is a soft terminator. The internal wide connector of the SCSI card is adapted to be coupled to one of the connectors on the cable.

A kit in accordance with the invention is advantageous in that it allows for a variety of combinations of internal and external devices of both narrow and wide types to be simultaneously interconnected to a SCSI bus without the necessity of multiple host-adapter cards.

A kit in accordance with the invention is also advantageous in that it utilizes minimal hardware to achieve such connectivity.

A kit in accordance with the invention is further advantageous in that it provides a flexible connectivity solution to interconnecting SCSI devices to a SCSI bus while keeping costs to the consumer minimized.

Other advantages of the invention will be apparent to those of skill in the art upon a review of the detailed description below.

BRIEF DESCRIPTION OF THE DRAWINGS

The present invention is described with respect to particular exemplary embodiments thereof and reference is accordingly made to the drawings (that are not necessarily drawn to scale), in which like reference numbers denote like parts, and in which.

DETAILED DESCRIPTION

Figure 1:
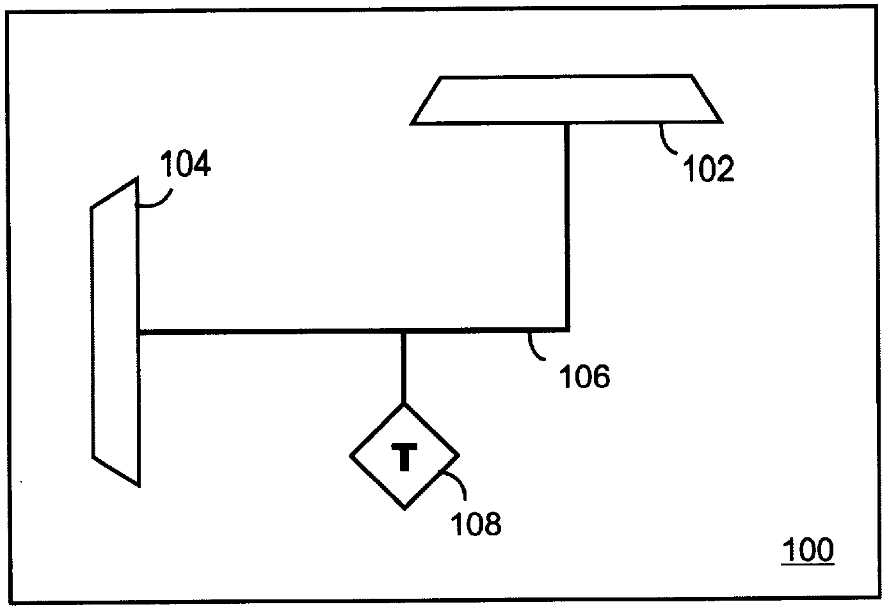
FIG. 1 is a schematic block diagram of a narrow card.

In order to achieve simultaneous connectivity for multiple types of devices, e.g., internal narrow, external narrow, internal wide, and external wide devices, a kit 300 in accordance with the invention is disclosed and described in detail with reference to FIG. 3. The kit 300 preferably includes a cable 330, a terminator-adapter unit 350, and, optionally, a SCSI card 310.

Specifically, optional SCSI card 310 includes a narrow external connector 312, a wide internal connector 314 and a narrow internal connector 316. The narrow external connector 312 is adapted to be coupled to external narrow devices, the wide internal connector 314 is adapted to be coupled to internal wide devices, and the narrow internal connector 316 is adapted to be coupled to internal narrow devices. (As used herein, external devices are generally devices external to the host enclosure while internal devices reside inside the host enclosure.) Each connector is generally connected to the respective devices via a SCSI cable, which is available in both wide and narrow varieties. In one embodiment of the invention, connector 312 and connector 314 are each female connectors.

A wide bus 320 is coupled to the wide internal connector 314. The wide bus includes a lower bus 318 and an upper bus 319. The upper bus 319 is terminated with fixed terminator 322. The lower bus 318 is further coupled to narrow internal connector 316 and narrow external connector 312. A soft terminator 324 is coupled to the lower bus 318. As indicated in FIG. 3 and other figures, a fixed terminator is illustrated with a "T" surrounded by a square outline, and a soft terminator is illustrated with a "T" surrounded by a diamond outline. In one embodiment, SCSI card 310 is designed to be connected to the PCI bus of a host computer system.

A cable 330 includes a wide connector 332 and a wide connector 334. In one embodiment of the invention, connector 332 is a male connector and connector 334 is a female connector. Cable 330 further includes a wide bus 340, which includes an upper, or high, SCSI bus 339 and a lower SCSI bus 338. The wide bus 340 is coupled to each of connectors 332 and 334. Cable 330 further includes short drops, or stubs, to connect to various internal wide SCSI devices. The stubs are represented by connectors 336*a* and 336*b*. In one embodiment, cable 330 is an ultra-wide SCSI-3 cable.

Terminator-adapter unit 350 includes a wide connector 352 and a narrow connector 354. In one embodiment, connector 352 is a male connector and connector 354 is a female connector. A wide bus 358 is coupled to wide connector 352. Wide bus 358 includes upper bus 357 and lower bus 356. Upper bus 357 is coupled to fixed terminator 360. Lower bus 356 is coupled to narrow connector 354 and is also coupled to soft terminator 362.

Various elements of a system in accordance with the invention are adapted to be interconnected with each other and/or to various SCSI devices. For instance, the cable 330 is adapted to be coupled to the SCSI card 310 by coupling connector 332 to connector 314. When cable 330 is coupled to card 310, the upper bus 339 is coupled to the upper bus 319 and the lower bus 338 is coupled to the lower bus 318. The cable 330 can also be coupled to internal wide devices via drops 336*a* and 336*b*.

The cable 330 is further adapted to be coupled to terminator-adapter 350 by connecting connector 334 to connector 352. When cable 330 is connected to terminator-adapter 350, the upper bus 339 is coupled to the upper bus 357 and the lower bus 338 is coupled to the lower bus 356. Alternatively, the cable 330 is capable of being coupled to external wide devices via connector 334 rather than to terminator-adapter 350. In addition, the terminator-adapter is capable of being coupled to external wide devices via connector 352 and to external narrow devices via connector 354. When the various upper busses and various lower busses of each element are coupled together, they are referred to generically herein as simply the upper bus and the lower bus.

Figure 3:
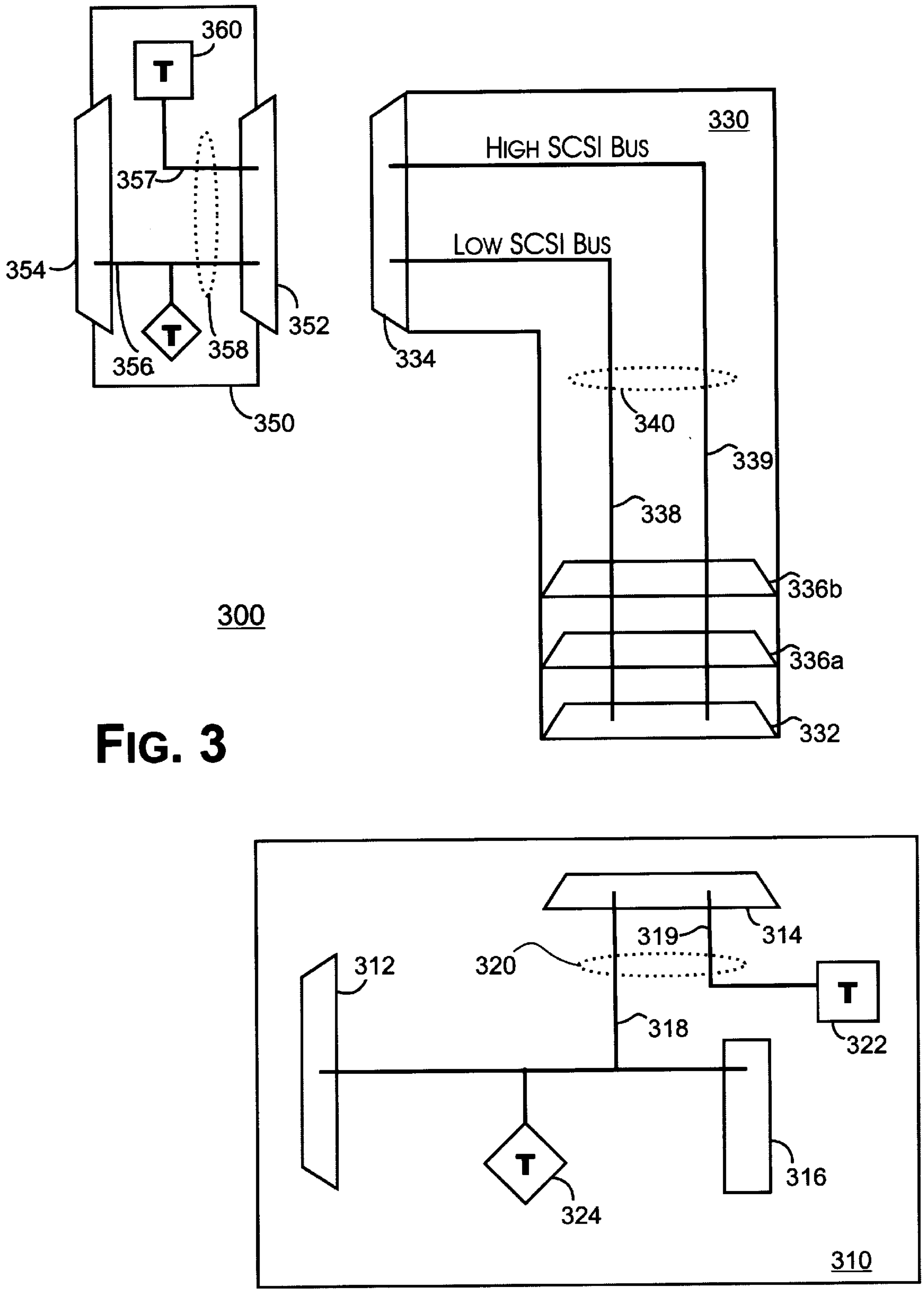
FIG. 3 is a schematic block diagram of a kit in accordance with the invention.

Various terminator structures can be used in the embodiment of the invention shown in FIG. 3. For instance, a Thevenin-type terminator can be used for a fixed terminator, consisting of a pull-up and a pull-down resistor. Because of power considerations, however, a fixed terminator such as that shown in FIG. 3*a* is generally preferred. In FIG. 3*a,* since the impedance of the transmission line is typically in the 105–110 Ω range, a 110 Ω resistor pulls the transmission line up to 2.85 V. The 2.85 V is maintained by a voltage regulator. Other fixed terminators are also acceptable in other embodiments of the invention.

The soft terminator used must be capable of being disabled, and thus allowing signals to pass unaffected by the terminator's presence on the transmission line. In some embodiments of the invention, disabling of soft terminators can be done manually, e.g., via switches or physical removal/insertion of a terminating structure, at the time various devices are coupled to the SCSI bus. In other embodiments of the invention, the soft terminator senses whether there are any subsequent devices on the SCSI bus and then automatically disables or enables itself accordingly. In one embodiment of the invention, the soft terminator senses the presence of a ground signal on certain predetermined lines. When a ground signal is sensed indicating the presence of additional devices, the soft terminator isolates itself from the rest of the circuit. Alternative embodiments of the invention sense current flow.

Figure 3B:
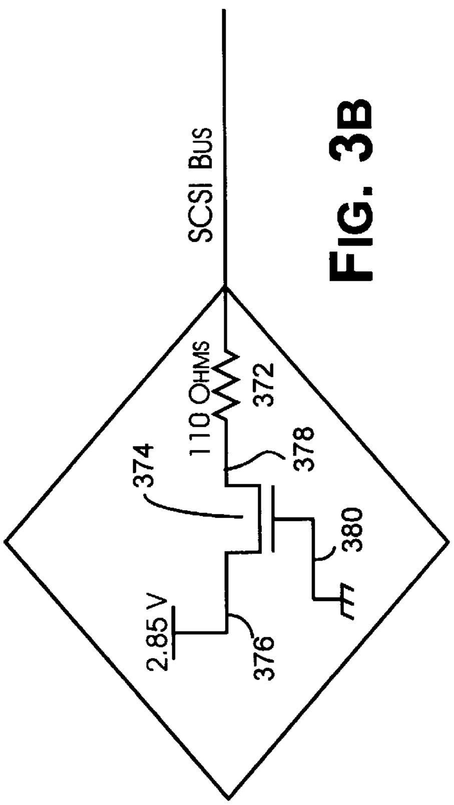
FIG. 3*b* is a schematic block diagram of a soft terminator in accordance with the invention.
Figure 3A:
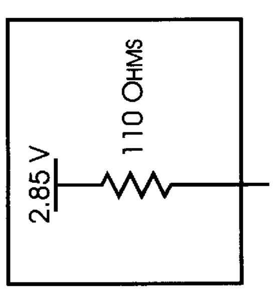
FIG. 3*a* is a schematic block diagram of a fixed terminator in accordance with the invention.

One embodiment of a soft terminator in accordance with the invention is shown in FIG. 3*b*. The soft terminator in FIG. 3*b* includes a 110 Ω resistor 372 having one terminal coupled to the transmission line (the SCSI bus) and the other terminal coupled to the source 378 of MOSFET transistor 374. The MOSFET drain 376 is coupled to 2.85 V, maintained by a voltage regulator. The gate 380 of the transistor 374 is coupled to the ground line to be sensed. When a ground signal is sensed, the transistor 374 is in an "off" state, or non-conducting state, isolating the 2.85 V power supply from the rest of the circuit. When no ground is sensed, the transistor 374 is "on", or conducting, and the resistor 372 is pulled-up to 2.85 V, terminating the transmission line.

The versatility of a kit containing a SCSI card 310, a cable 330, and a terminator-adapter unit 350 in accordance with the invention will be demonstrated with reference to several examples described below.

Figure 4:
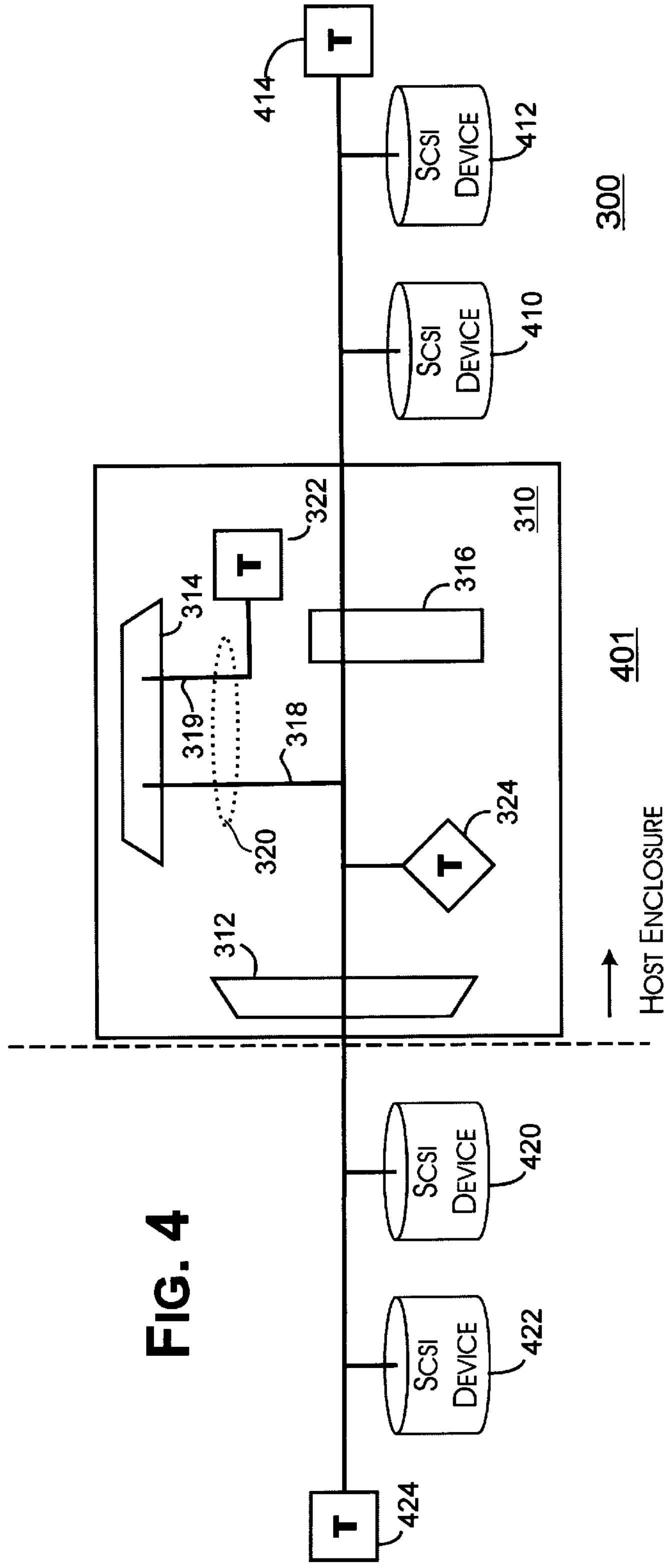
FIGS. 4–10 are schematic block diagrams of a kit in accordance with the invention as used to interconnect various combinations of SCSI devices.

FIG. 4 demonstrates the ability of a system in accordance with the invention to interconnect internal narrow and external narrow devices to the SCSI card, which resides in host enclosure 401 (demarcated by a dashed line). Internal narrow SCSI devices 410, 412 are coupled to lower bus 318 via connector 316. External narrow SCSI devices 420, 422 are coupled to lower bus 318 via connector 312. The ends of the SCSI bus are terminated by fixed terminators 414 and 424, respectively. Soft terminator 324 is disabled.

Figure 5:
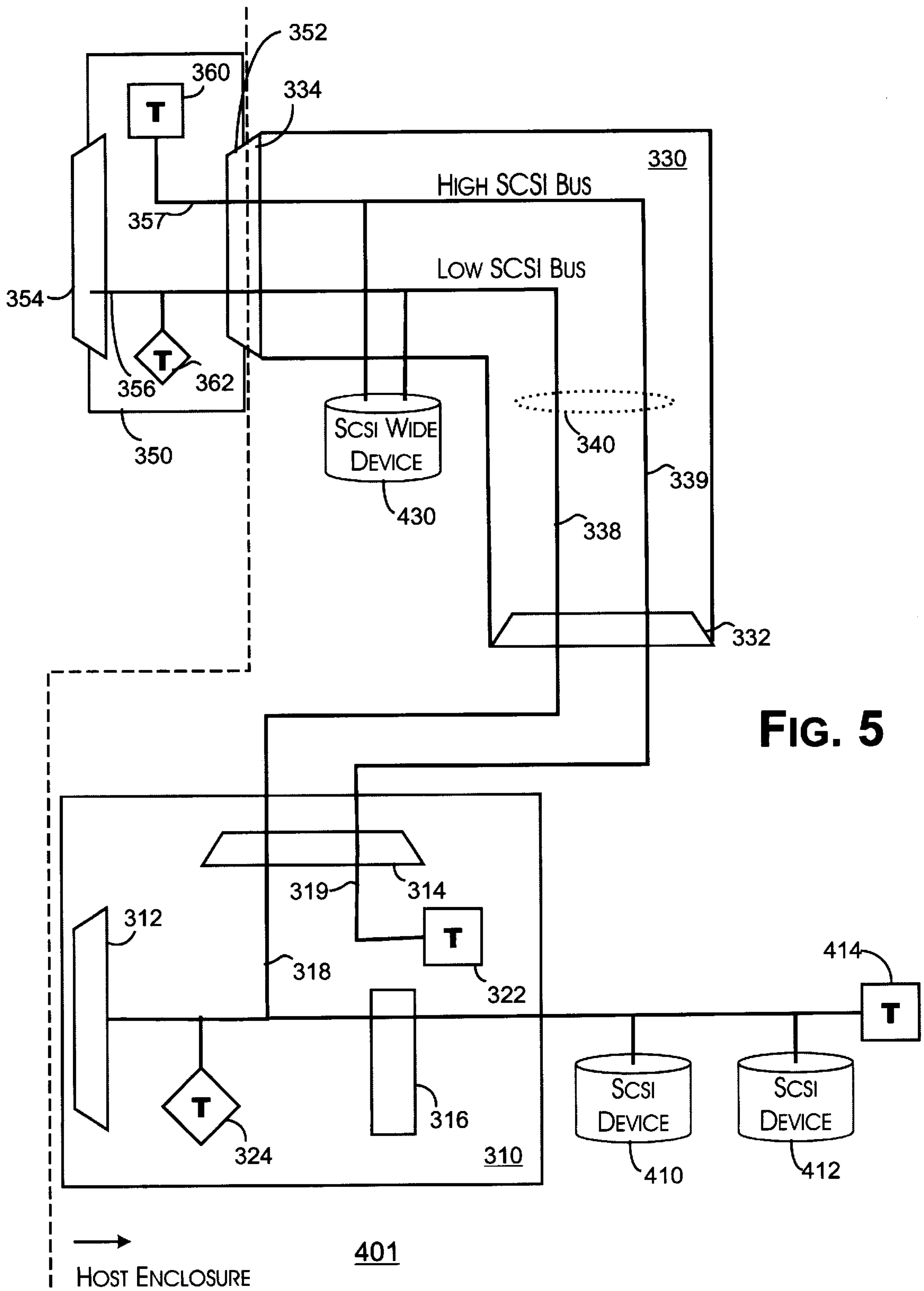

FIG. 5 demonstrates the ability of a kit in accordance with the invention to interconnect an internal narrow device and an internal wide device to the SCSI card. Wide connector 332 of cable 330 is coupled to wide internal connector 314 of card 310. Wide connector 334 of cable 330 is coupled to wide connector 352 of terminator-adapter unit 350. Soft terminator 362 of terminator-adapter unit 350 is enabled to terminate the lower bus 356. An internal wide SCSI device 430 is coupled to cable 330. Internal narrow SCSI devices 410 and 412 are coupled to bus 318 via narrow connector 316. The SCSI bus is terminated on one end by fixed terminator 414, which terminates the lower bus, and fixed terminator 322, which terminates the upper bus. The other end of the SCSI bus is terminated with terminator-adapter unit 350, and specifically with fixed terminator 360 on the upper bus and soft terminator 362 on the lower bus.

Figure 6:
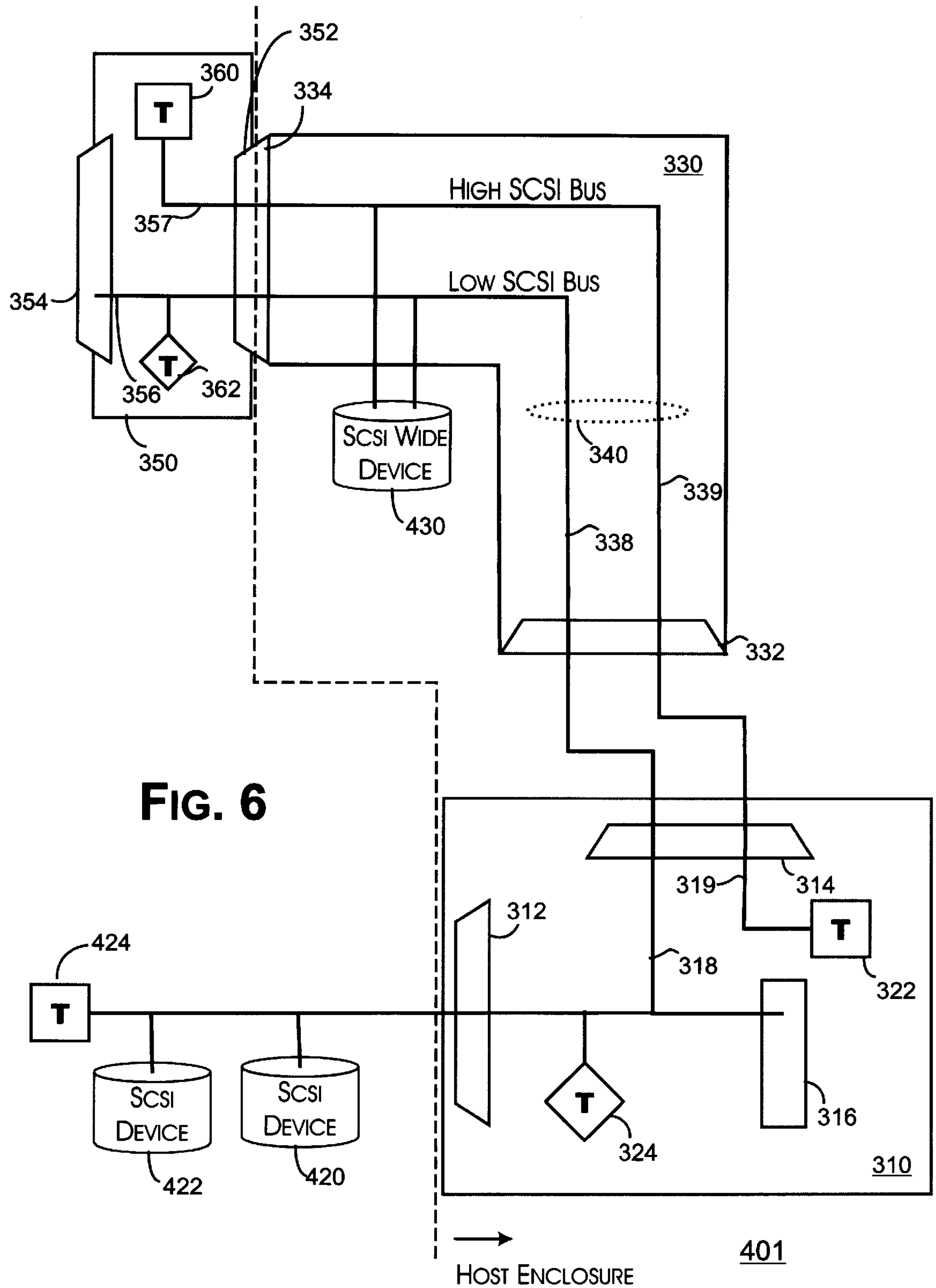

FIG. 6 demonstrates a kit in accordance with the invention as used to connect internal wide devices and external narrow devices to the SCSI card. Wide connector 332 of cable 330 is coupled to wide internal connector 314 of card 310. Wide connector 334 of cable 330 is coupled to wide connector 352 of terminator-adapter unit 350. Soft terminator 362 of terminator-adapter unit 350 is enabled to terminate the lower bus 356. An internal wide SCSI device 430 is coupled to cable 330. External narrow SCSI devices 420, 422 are coupled to SCSI card 310 via connector 312. The lower SCSI bus is terminated by fixed terminator 424 at one end and soft terminator 362 at the other end. The upper SCSI bus is terminated by terminator 322 at one end and terminator 360 at the other end. Soft terminator 324 is disabled.

Alternatively, to achieve connectivity of the same types of devices as in FIG. 6, external narrow SCSI devices 420, 422 could be coupled to the system via connector 354 of the terminator-adapter unit 350 rather than connector 312. When the external narrow devices 420, 422 are coupled to connector 354, soft terminator 362 is disabled while soft terminator 324 is enabled to terminate the lower bus. Thus, rather than behaving as a terminator as shown in FIG. 6, in this alternatively-described configuration, terminator-adaptor unit 350 behaves as a wide-to-narrow adapter. Terminator 424 would still be required to ultimately terminate the lower bus.

Figure 7:
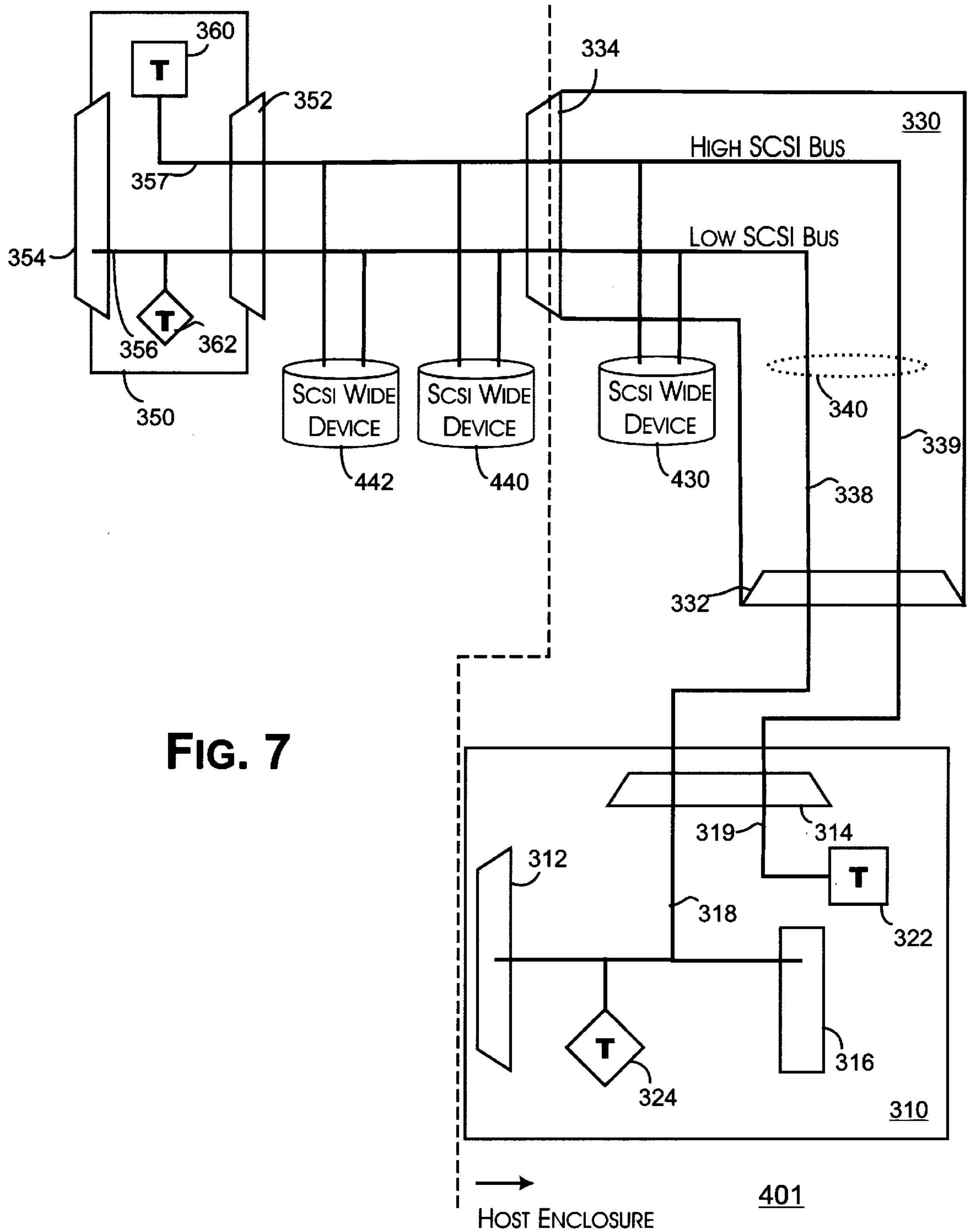

FIG. 7 demonstrates the system as used to connect internal wide SCSI devices and external wide SCSI devices to the SCSI card. Wide connector 332 of cable 330 is coupled to wide internal connector 314 of card 310. An internal wide SCSI device 430 is coupled to cable 330. External wide SCSI devices 440, 442 are coupled to connector 334 of cable 330. In addition, terminator-adapter unit 350 is also coupled to external wide SCSI devices 440, 442 via connector 352. In the configuration of FIG. 7, terminator-adapter unit 350 acts as a terminator, terminating the entire wide bus by enabling terminator 362. In addition, terminator 324 is also enabled so that terminator 324 and 322 terminate the other end of the wide bus.

Figure 8:
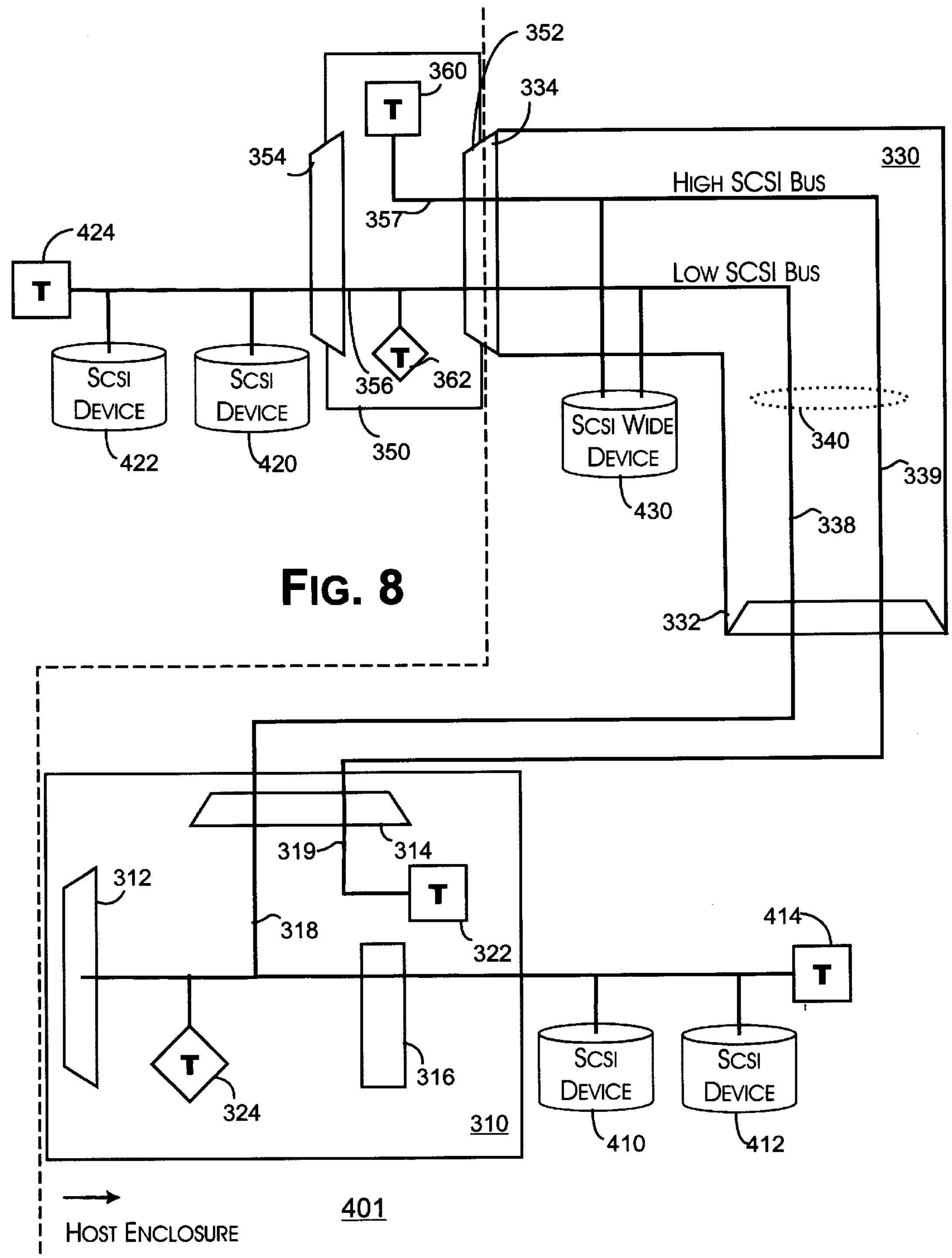

FIG. 8 demonstrates the ability of a system in accordance with the invention to simultaneously interconnect an internal wide device, an internal narrow device, and an external narrow device to the SCSI card. Wide connector 332 of cable 330 is coupled to wide internal connector 314 of card 310. Wide connector 334 of cable 330 is coupled to wide connector 352 of terminator-adapter unit 350. Internal narrow SCSI devices 410 and 412 are coupled to the lower bus 318 via narrow connector 316. An internal wide SCSI device 430 is coupled to cable 330. External narrow devices 420 and 422 are coupled to the lower bus via connector 354. Soft terminator 362 is disabled, causing terminator-adapter unit 350 to behave as a wide-to-narrow adapter. The SCSI bus is terminated by fixed terminators 360 and 424 at one end and terminators 320 and 414 at the other end.

Figure 9:
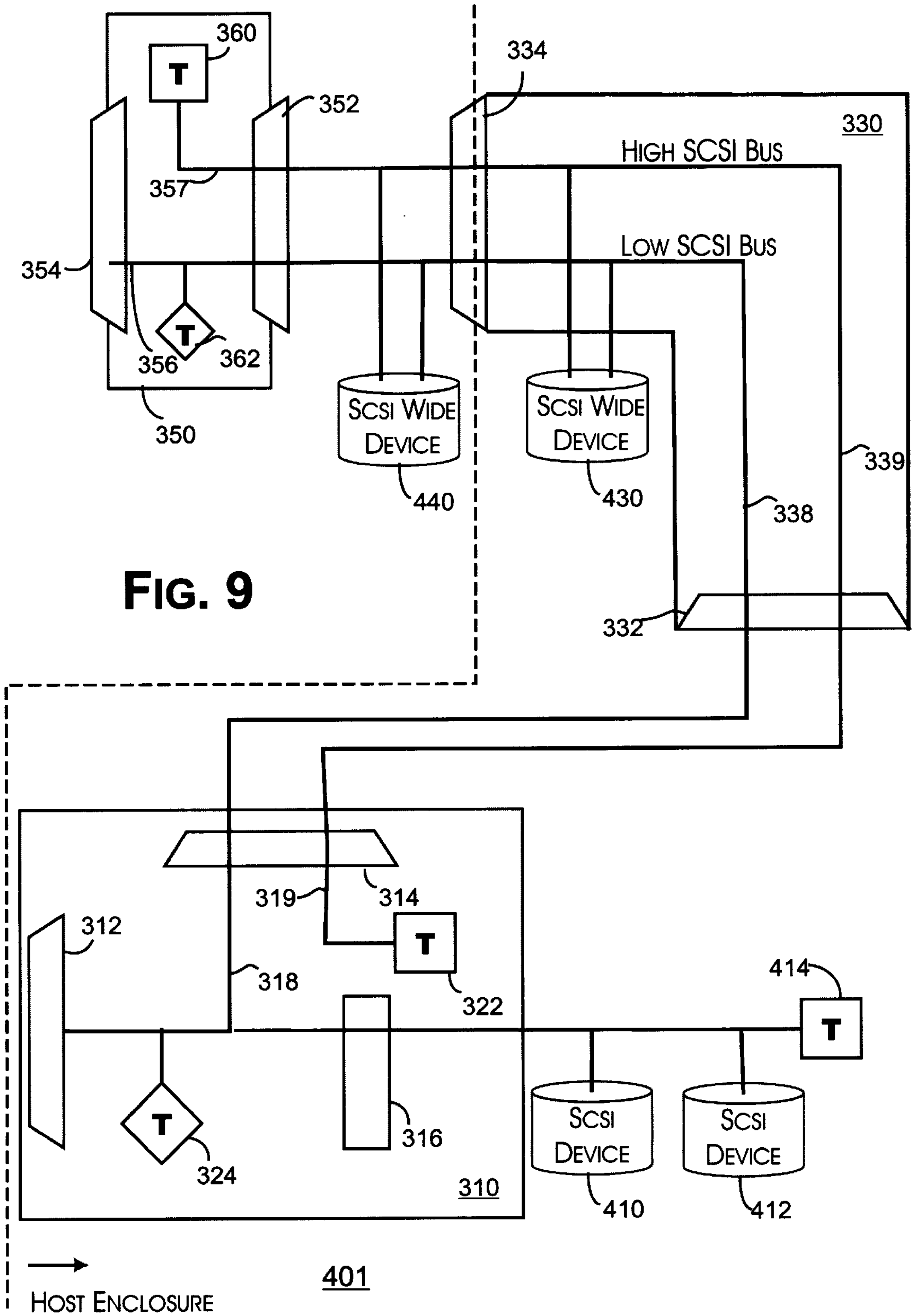

FIG. 9 demonstrates the ability of a system in accordance with the invention to interconnect an internal wide device, an internal narrow device, and an external wide device to a SCSI card. Wide connector 332 of cable 330 is coupled to wide internal connector 314 of card 310. Internal narrow SCSI devices 410 and 412 are coupled to the lower bus 318 via narrow connector 316. An internal wide SCSI device 430 is coupled to cable 330. An external wide device 440 is coupled to the wide bus via connector 334. Terminator-adapter 350 is coupled to device 440 via connector 352 and acts as a wide bus terminator with soft terminator 362 enabled. The other end of the SCSI bus is terminated with fixed terminators 322 and 414.

Figure 10:
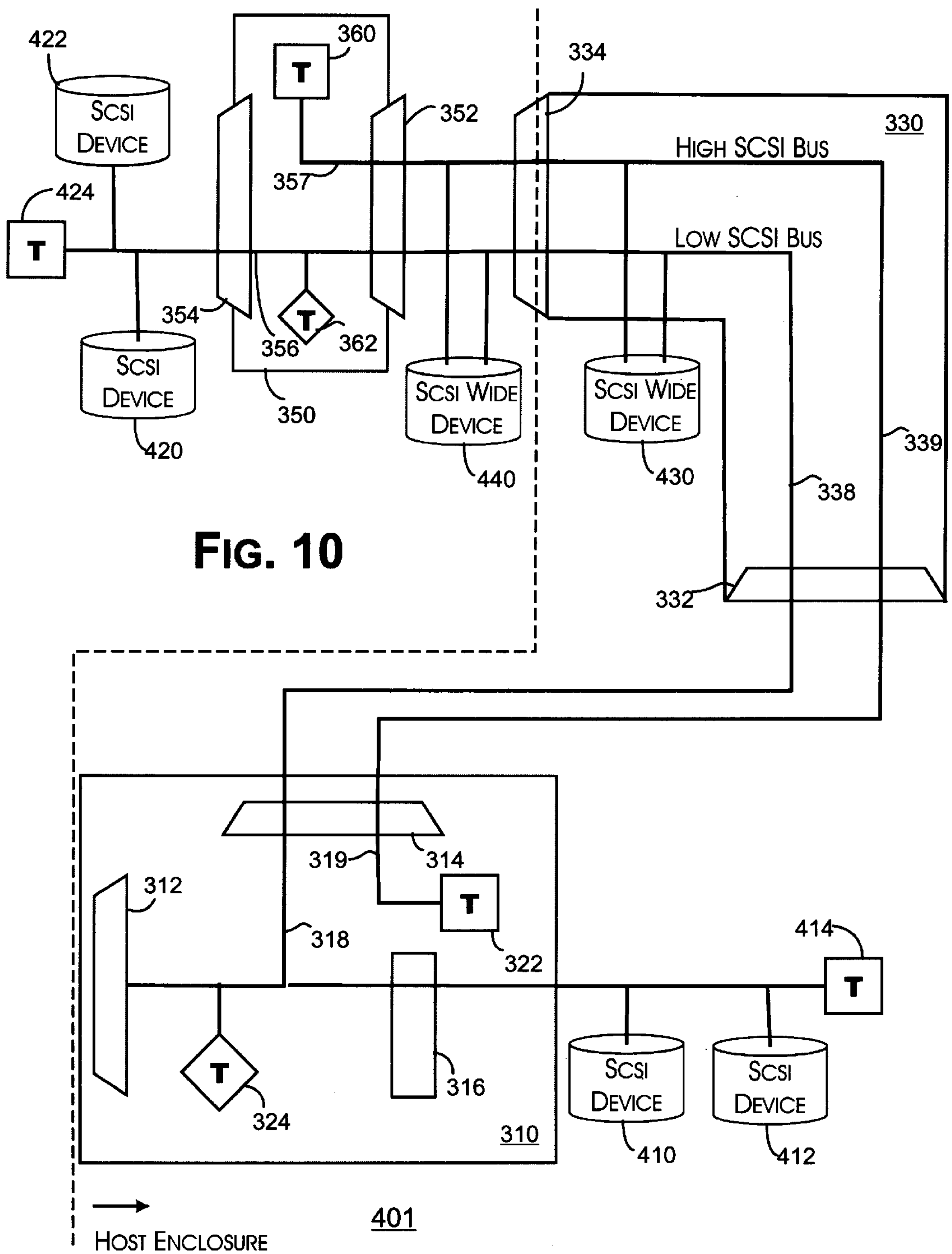

Finally, FIG. 10 demonstrates the ability to connect all four device types (internal wide, internal narrow, external wide, external narrow) to the SCSI card. Wide connector 332 of cable 330 is coupled to wide internal connector 314 of card 310. Internal narrow SCSI devices 410 and 412 are coupled to the lower bus 318 via narrow connector 316. An internal wide SCSI device 430 is coupled to cable 330. An external wide device 440 is coupled to the wide bus via connector 334. Terminator-adapter unit 350 is coupled to external wide device 440 via connector 352. External narrow SCSI devices 420, 422 are coupled to the lower bus via connector 354. The soft terminators 362 and 324 are disabled. The wide bus is terminated with terminators 360 and 424 at one end and terminators 322 and 414 at the second end.

As demonstrated by the examples, much of the system's flexibility stems from the fact that the upper bus termination problem with adapters encountered in conventional technology has been overcome in the present invention by ensuring that the upper bus is terminated at its end points, and only at its end points. Further, a kit in accordance with the invention enables the simultaneous attachment of three or more differing types of deices without deviating from a backbone structure.

Figure 2:
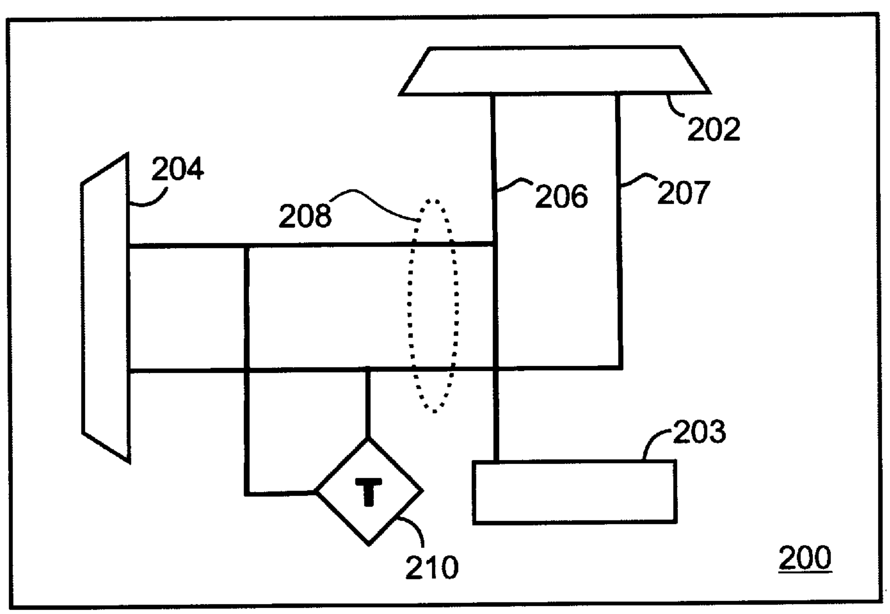
FIG. 2 is a schematic block diagram of a wide card.

It should be clear to those of skill in the art from the above examples that a kit 300 containing a SCSI card 310, a cable 330, and a terminator-adapter unit 350 can be extremely useful. Moreover, it should be clear to those of skill in the art that the cable 330 and terminator-adapter 350 can also be useful to obtain most of the configurations described above with a wide SCSI card such as that described with reference to FIG. 2. Thus, the principles of the invention will be available to consumers without the need to purchase a new SCSI card, and without the need to purchase multiple SCSI cards. A consumer need only to purchase a relatively inexpensive cable 330 and terminator-adapter 350. A SCSI card without an external connector 312 can also be used in various embodiments of the invention.

A kit or system in accordance with the invention is advantageous in that it allows virtually any configuration of internal wide, internal narrow, external wide, and external narrow devices with a SCSI card using the same small set of inexpensive hardware for each configuration. Such a kit allows such interconnections without the use of additional adapters or additional SCSI cards. Such a kit also offers the ability to create useful configurations to support common devices: for instance, the configuration of FIG. 8 allows for the simultaneous connection of, e.g., an internal CD-ROM (generally only available as a narrow device), an internal wide hard disk, and an external Iomega ZIP drive™ or scanner (narrow devices). Moreover, such a kit will be relatively inexpensive to the consumer while at the same time providing considerable flexibility.

It should be understood that the particular embodiments described above are only illustrative of the principles of the present invention, and various modifications could be made by those skilled in the art without departing from the scope and spirit of the invention.

What is claimed is:

1. A kit having component parts capable of being assembled with a plurality of SCSI devices, including a SCSI host adapter card, to provide SCSI device interconnectability, wherein said SCSI host adapter card includes a first connector of a first width, said kit comprising:

(a) a cable, including a second connector adapted to be coupled to said first connector of said host adapter SCSI card, and a third connector of said first width; and (b) a terminator-adapter, including a fourth connector adapted to be coupled to said third connector, a fifth connector of a second width, a first upper bus coupled to the fourth connector, a first lower bus coupled to the fourth connector and to the fifth connector, a first terminator coupled to the first upper bus, and a second terminator coupled to the first lower bus, said second terminator being a soft terminator that is automatically isolated from said first lower bus when a device is coupled to said fifth connector.

2. The kit of claim 1, wherein said first upper bus is coupled between said fourth connector and said first terminator and wherein said first terminator is a fixed terminator.

3. The kit of claim 2, wherein said cable further includes:

a second upper bus coupled to the second connector and to the third connector, and a second lower bus coupled to the second connector and to the third connector.

4. The kit of claim 3 wherein said cable is an ultra wide SCSI-3 cable.

5. The kit of claim 4, wherein said cable is adapted to be coupled to an internal wide device;

said third connector is adapted to be coupled to an external wide device;

said fourth connector is adapted to be coupled to one of said third connector and said external wide device; and said fifth connector is adapted to be coupled to an external narrow device.

6. A system for interconnecting a first internal SCSI device having a first data width, a second internal SCSI device having a second data width, and a third external SCSI device, comprising:

(a) a SCSI card, including a first external connector of said second data width, a second internal connector of said first data width, a third internal connector of said second data width coupled to said second internal SCSI device, a first upper bus coupled to said first internal connector, a first lower bus coupled to said second internal connector, said third internal connector, and said first external connector, a first fixed terminator coupled to the first upper bus, and a second soft terminator coupled to the first lower bus;

(b) a cable coupled to said first internal SCSI device, said cable including a fourth connector of said first data width coupled to said second internal connector of said SCSI card, a fifth connector of said first data width, a second upper bus coupled to the fourth connector and to the fifth connector, and a second lower bus coupled to the fourth connector and to the fifth connector, and (c) a terminator-adapter coupled to said third external device, said terminator-adaptor including a sixth connector of said first data width, a seventh connector of said second data width, a third upper bus coupled to the sixth connector and coupled to said second upper bus, a third lower bus coupled to the sixth connector, to the seventh connector, and coupled to said second lower bus, a third terminator coupled to the third upper bus, and a fourth soft terminator coupled to the third lower bus.

7. The system of claim 6, wherein said third upper bus is operatively coupled to said second upper bus and said third lower bus is operatively coupled to said second lower bus.

8. The system of claim 7, wherein said sixth connector is coupled to said third external device.

9. The system of claim 8, wherein said sixth connector is coupled to a wide device.

10. The system of claim 9, wherein said wide device includes a SCSI cable.

11. The system of claim 6, wherein said seventh connector is coupled to said third external device.

12. The system of claim 11, wherein said seventh connector is coupled to a narrow device.

13. The system of claim 6 wherein said fourth soft terminator is selectively isolatable from the third lower bus.

14. The system of claim 13, wherein said fourth soft terminator is isolated from the third lower bus when a ground signal is received by said second soft terminator.

15. The system of claim 14, wherein said third terminator is a fixed terminator.

16. The system of claim 15, wherein said second internal connector, said third internal connector, said fourth connector, said fifth connector, and said sixth connector are each wide connectors and said first external connector and said seventh connector are each narrow connectors.

* * * * *